F. C. BIGGERT, Jr.
MANIPULATOR FOR PLATES AND THE LIKE.
APPLICATION FILED NOV. 2, 1918.
1,340,594.
Patented May 18, 1920.
4 SHEETS—SHEET 1.
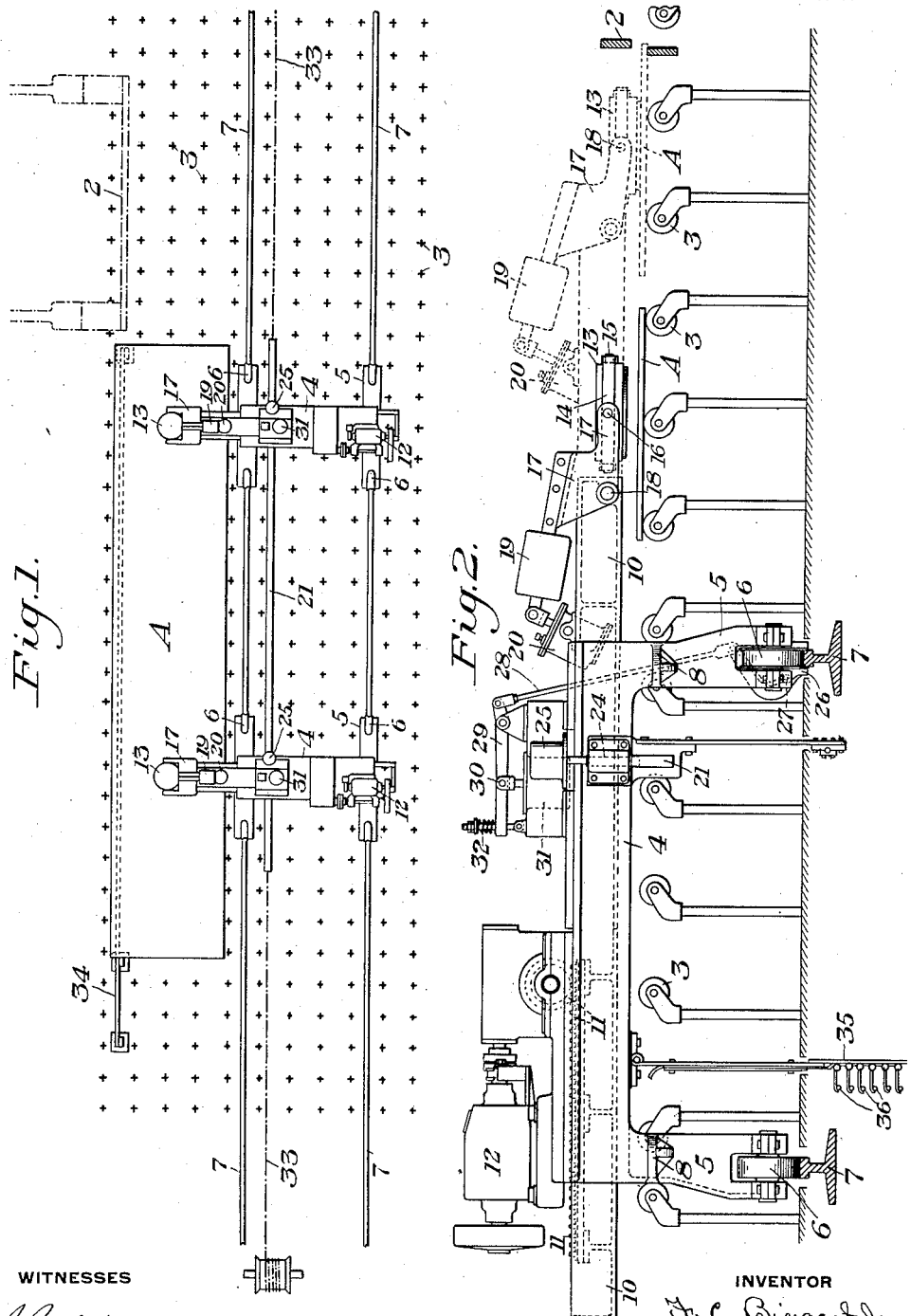

F. C. BIGGERT, Jr.
MANIPULATOR FOR PLATES AND THE LIKE.
APPLICATION FILED NOV. 2, 1918.
1,340,594.
Patented May 18, 1920.
4 SHEETS—SHEET 2.
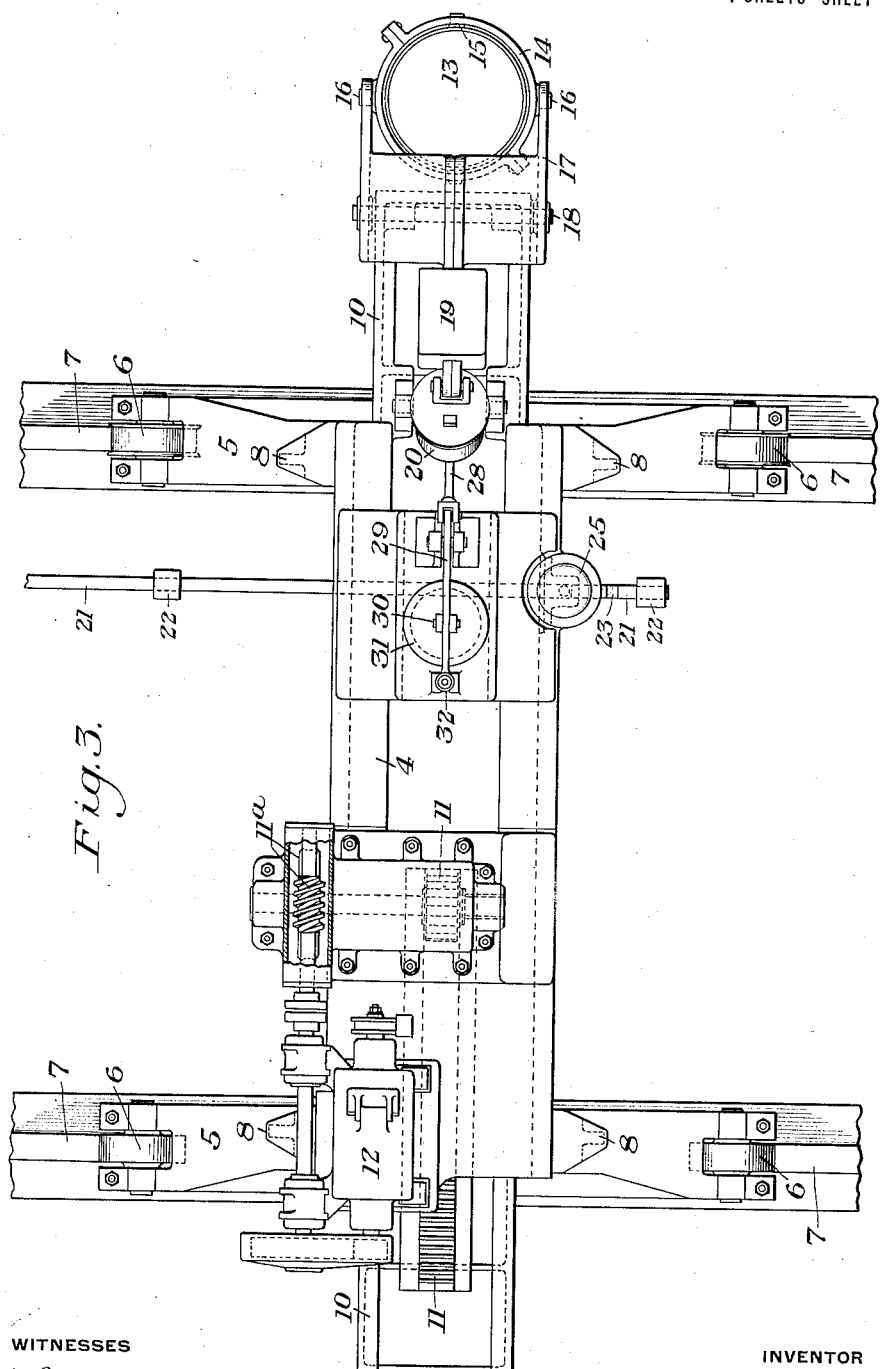
WITNESSES
INVENTOR

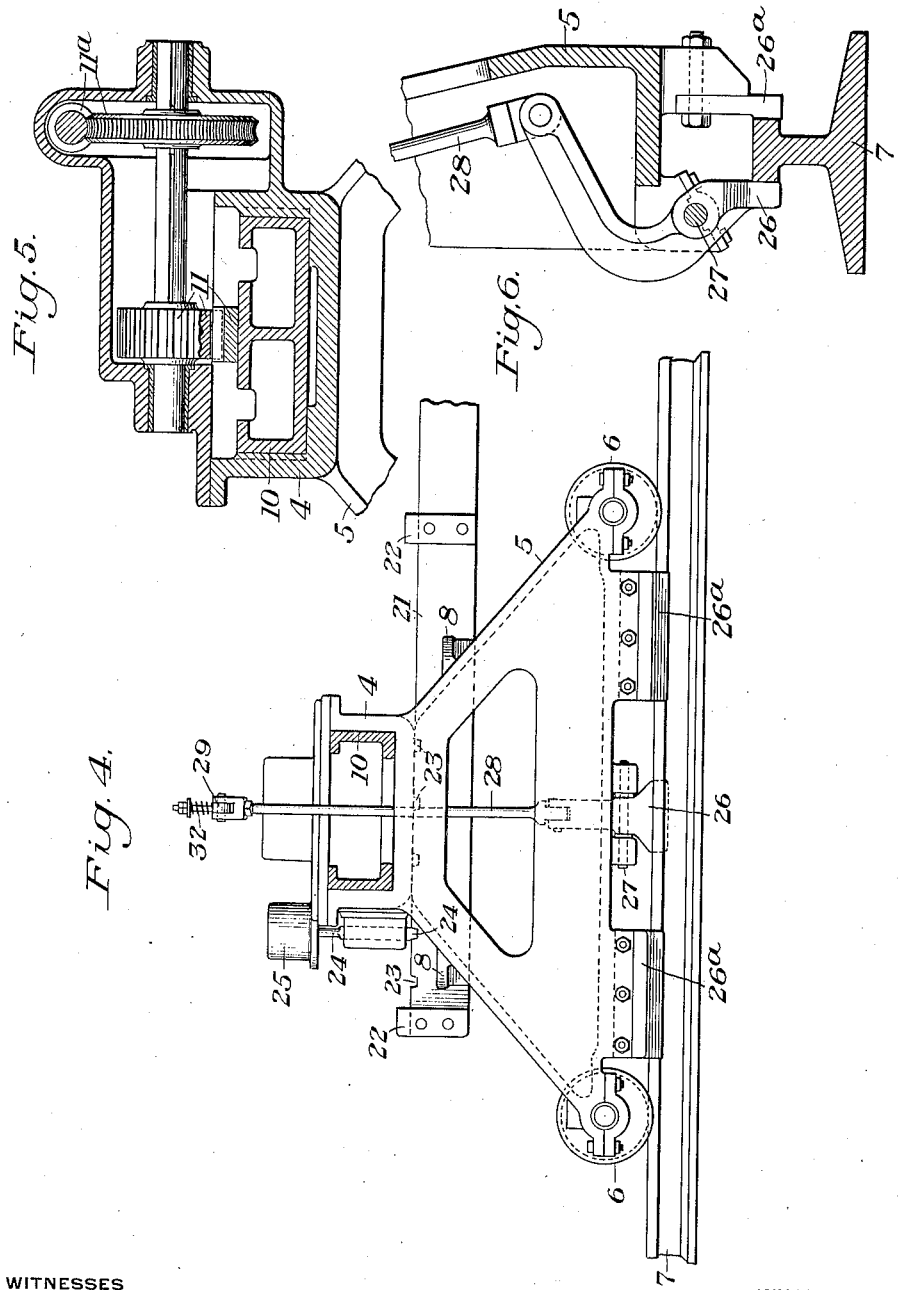

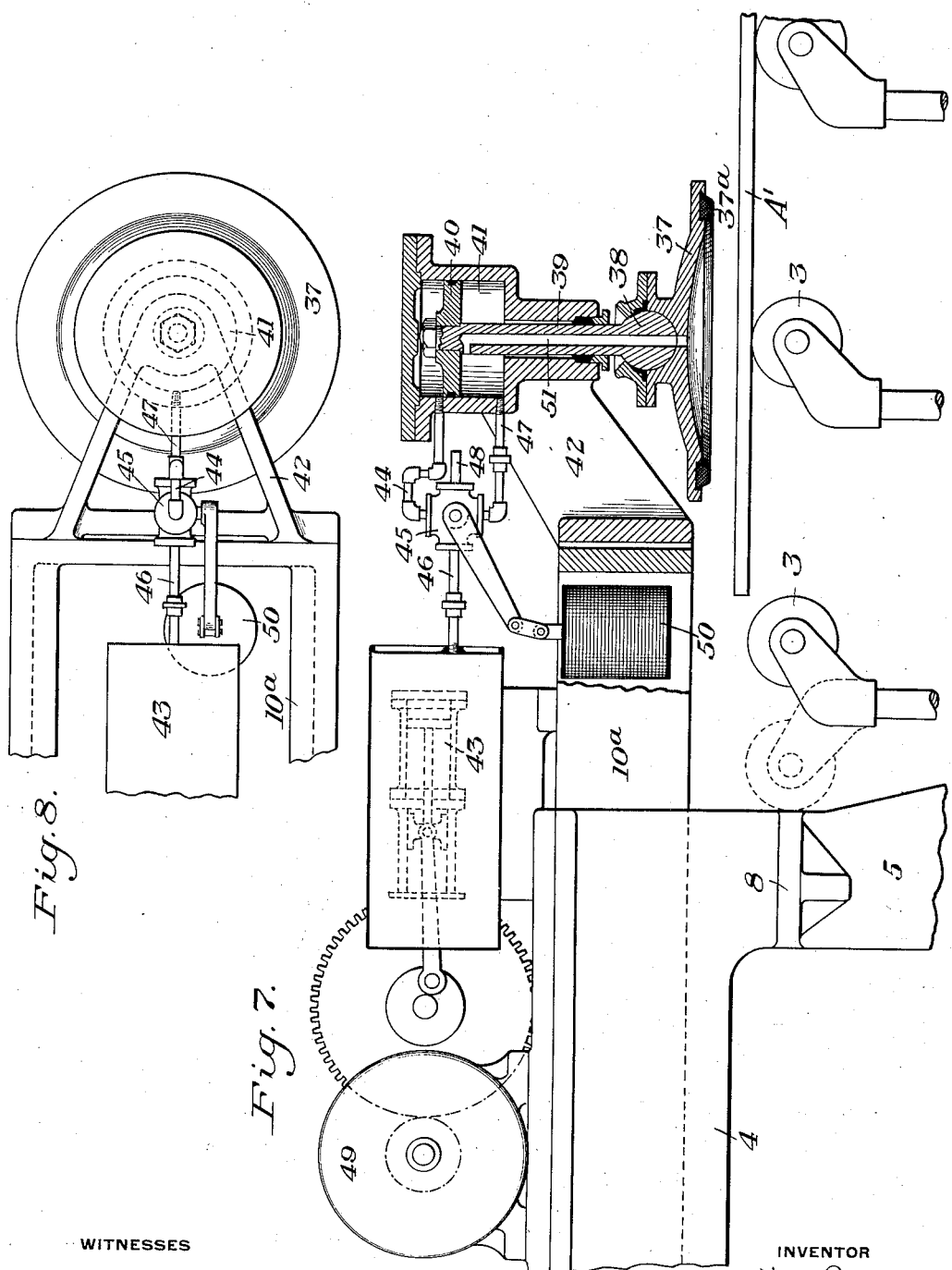

UNITED STATES PATENT OFFICE.

FLORENCE C. BIGGERT, JR., OF CRAFTON, PENNSYLVANIA, ASSIGNOR TO UNITED ENGINEERING & FOUNDRY COMPANY, OF PITTSBURGH, PENNSYLVANIA, A CORPORATION OF PENNSYLVANIA.

MANIPULATOR FOR PLATES AND THE LIKE.

1,340,594.  Specification of Letters Patent.  Patented May 18, 1920.

Application filed November 2, 1918. Serial No. 260,852.

*To all whom it may concern:*

Be it known that I, FLORENCE C. BIGGERT, Jr., a citizen of the United States, residing at Crafton, in the county of Allegheny and State of Pennsylvania, have invented a new and useful Improvement in Manipulators for Plates and the like, of which the following is a full, clear, and exact description, reference being had to the accompanying drawings, forming part of this specification, in which—

Figure 1 is a plan view showing my invention applied to a shear table.

Fig. 2 is an end elevation of the same.

Fig. 3 is a plan view showing one of the manipulators on a larger scale.

Fig. 4 is a view partly in side elevation and partly in vertical section, and showing one of the carriages.

Fig. 5 is a detail sectional view showing the means for actuating one of the transversely movable manipulator bars.

Fig. 6 is a detail sectional view showing one of the rail clamps.

Fig. 7 is a sectional elevation showing a modified form of lifter, and

Fig. 8 is a plan view of the lifter.

My invention has relation to manipulator mechanism for plates and the like, and while I have herein shown and described the manipulator as applied to a shear table, it can be used for other purposes.

My invention is designed to provide a manipulator by means of which plates of relatively large size may be readily and conveniently located on the table preparatory to shearing, and then moved to the action of the shear. My invention also provides a manipulator of this character which is simple in its construction and mode of operation, and which can be readily controlled by an operator located at any desired point. A further object of my invention is to provide a manipulator which can be readily applied to existing shear tables without change in the latter, and which in no wise interferes with the hand manipulation of plates of such form or size as may be more conveniently so manipulated.

The nature of my invention will be best understood by reference to the accompanying drawings which will now be described, it being premised, however, that various changes can be made in the details of construction, arrangement and combination of the several parts without departing from the spirit and scope of my invention, as defined in the appended claims.

In these drawings the numeral 2 indicates, in a conventional manner, the removable blade of a plate shear. 3 designates swiveled casters of the usual character constituting the shear table. These casters are shown conventionally in Fig. 1 and more in detail in Figs. 2 and 7. They are placed in the usual manner in longitudinal and transverse rows being swiveled on their supporting posts so that they can readily turn in a horizontal plane.

In the form of manipulator which is illustrated in Figs. 1 to 6 inclusive, there are two manipulator members which are substantially duplicates of each other. The description of one of these members will apply to both, corresponding reference characters being applied to each. Each of these members consists of a carriage 4 having depending legs 5 carrying wheels 6 arranged to travel upon track rails 7. The legs 5 are of such dimensions as to travel freely between adjacent rows of casters. They are preferably provided with projections 8 which will readily enter between two adjacent casters, and turn them out of the road when the carriage is moved, if they are in an interfering position.

Mounted to reciprocate in suitable guides on the truck 4 is a transversely movable manipulator bar 10. This bar can be reciprocated by any suitable means such as the rack and pinion illustrated at 11, the pinion being driven from an electric motor 12 mounted on the carriage 4 to move therewith, through the worm gearing 11$^a$. 13 designates a magnetic grip device which consists of an electro-magnet which is mounted in a ring 14 upon the trunnions 15, the ring, in turn, being mounted upon trunnions 16 in the arms of a lever 17 which is pivoted at 18 to the forward end portion of the manipulator bar 10. This lever member is counterweighted, as indicated at 19, and is also provided with a suitable dash-pot connection 20. The double trunnion mounting of the magnet forms a universal joint which enables it to adjust itself to a position in which its lower or polar face will always be substantially parallel to the surface of the plate A to be manipulated, notwithstanding changes in the position of the lever 17 or any slight unevenness in the plate surface. The two carriages 4 are adjustably connected by a spacing bar 21 whereby the two carriages are held at an adjustably fixed distance apart and transversely of the track rails 7. This bar is provided with stops 22 (see Fig. 4) which limit the adjustment, and also with a plurality of notches 23, any one of which may be engaged by a latch pin 24 connected to the core of a solenoid magnet 25.

One leg 5 of each of the carriages is provided with a clamping jaw 26 adapted to engage the track rail in the manner best shown in Fig. 6. This jaw is pivoted at 27 and is connected by a link 28 with a lever 29, the latter having a connection at 30 with the plunger of a solenoid magnet 31. It is provided with a spring 32 which is arranged to act in opposition to the magnet. In the construction shown the clamping jaw is normally held in a released position by the action of the solenoid. When the magnet 31 is deënergized the spring 32 moves said jaw into rail clamping position.

The entire manipulator can be moved longitudinally on the track rails 7 by any suitable means, such as the endless cable 33, indicated in Fig. 1, attached to one of the trucks.

34 designates a straight edge which is placed in line with the cutting edge of the shear blade 2, and by means of which the plate A may be properly lined up preparatory to shearing.

The operation is as follows:

The plate A to be sheared having been placed upon the table, one of the lifting magnets 13 may be energized; and when energized will, by its action, be drawn downwardly into contact with the plate, as indicated in dotted lines in Fig. 2, this action taking place against the resistance of the check or dash-pot 20. The corresponding electric motor 12 can then be energized to move the manipulator bar 10 transversely to shift one end portion of the plate to proper position with respect to the straight edge 34. The other magnet may then be energized and the other motor 12 actuated in a similar manner to complete the position of the plate with respect to the straight edge. The cable 33 is then actuated to move the manipulator as a whole with the plate to the action of the shear blade 2. In practice, the coil of the solenoid magnet 31 may be connected in series with the circuit of the motor which actuates the cable 33, so that when the circuit of the motor is broken the magnet 31 will be simultaneously deënergized, thereby causing the clamping jaw 27 to immediately clamp the adjacent rail 7. The action of this jaw will not only lock the manipulator in position on the track rails during the shearing operation, but will also act to square up the manipulator with respect to the cutting edge of the shear blade, due to the fact that said jaw engages one side of the rail head, in the manner shown in Fig. 6; while the other side of such head is engaged by a fixed jaw 26ª.

The carriages 4 may be provided with suitable trolleys 35 having contacts 36 for engagement with the necessary electric wires for supplying current to the motor 13 and to the electro-magnets. I have not illustrated any particular arrangement of circuit controlling devices, as devices of this character are well-known in the art and can be readily supplied by any electrician, so that the operator can control the various circuits at will from his station.

The form of my invention just described is adapted for use in connection with iron or steel plates with which the magnetic grips or lifters are effective. For use with plates of non-magnetic material, such as copper plates, the modification shown in Figs. 7 and 8 may be provided. This form of my invention is generally similar to that first described, except that instead of magnetic grips or lifters, I provide pneumatic grips or lifters, one carried by each manipulator bar 10ª. Each of these devices consists of a suction plate 37 having a bottom gasket 37ª of flexible material adapted for contact with the plate A' to be manipulated. This suction plate has a ball and socket connection, which is indicated at 38, with a plunger rod 39 connected to a piston 40 which works in a cylinder 41 mounted on the overhanging supports 42, carried by the bar 10ª. This cylinder is connected above the piston 40 with an exhaust pump 43 through the pipe connections 44, four-way valve 45, and pipe connection 46. The cylinder space below the piston is similarly connected with the exhaust pump through the pipe connections 47, the four-way valve 45 and the pipe 46. The four-way valve 45 has the atmospheric connection indicated at 48. 49 designates an electric motor for actuating the exhaust pump, the latter, together with the motor, being mounted upon the manipulator bar 10ª. The valve 45 is shown as arranged to be actuated by a solenoid magnet 50. The operation of this form of my invention will be readily understood. The suction plate 37 is brought over to the plate being manipulated; the four-way valve is moved to a position in which the pipe 47 will be connected with the exhaust pump 43, and the pipe 44 will be connected to the atmosphere through the valve 45. This will cause the suction plate to drop by its own weight onto the plate A' after which the exhaust pump will cause it to grip the plate. When it is required to release the plate the four-way valve is reversed admitting air through pipe 47, thus breaking the vacuum in the cup and at the same time raising the cup by suction applied at the top of the piston.

The advantages of my invention will be apparent to those familiar with this art, since it provides a plate manipulator which is simple in its construction and mode of operation; which can be readily applied to existing shear tables; and which can be readily controlled by the operator.

While I have shown and described two different forms of grips or lifters which may be employed, I desire it understood that still other forms may be employed such, for instance, the mechanical grips described and claimed in my co-pending application, Serial No. 260,853, filed November 2, 1918, and which I desire to include in my broader claims herein. It will also be apparent that the mechanical construction and arrangement of the several parts, together with the actuating means may be widely varied without departing from the spirit and scope of my invention, as defined in the appended claims.

I claim:

1. A plate manipulator comprising a movable carriage, a horizontally extending manipulator bar mounted on said carriage for endwise movement in a direction at substantially right angles to the direction of movement of the carriage, and a plate lifter mounted on said bar for vertical movement, substantially as described.

2. The combination with a work-supporting table comprising a plurality of spaced-apart stands having work-supporting rollers swiveled to their upper end portions, of a plate-manipulator comprising a carrier having supporting members movable longitudinally of the table between said stands and rollers, a plurality of horizontally extending manipulator bars mounted for endwise movement on said carrier in a direction at substantially right angles to the direction of movement of said carrier, and plate-lifting devices mounted one on each of said bars and movable horizontally therewith, said devices being also movable vertically toward and away from said table, substantially as described.

3. The combination with a work-supporting table comprising a plurality of spaced-apart stands having work-supporting means swiveled to their upper end portions, of a plate-manipulator comprising a plurality of carriages whereby the distance between them may be adjustably fixed, a manipulator member mounted on each of said carriages for horizontal movement in a direction at substantially right angles to the movement of said carriages, and a vertically movable plate-lifting device mounted on each of the manipulator members, substantially as described.

4. A plate manipulator, comprising a carrier movable in a fixed path, a plurality of manipulator members mounted on said carrier for horizontal movement in a direction at substantially right angles to the direction of movement of said carrier, and a vertically movable plate lifter mounted on each of the manipulator members, substantially as described.

5. A plate manipulator, comprising a carrier movable in a fixed path, a plurality of manipulator members mounted on said carrier for horizontal movement in a direction at substantially right angles to the direction of movement of said carrier, and a plate lifter mounted on each of said manipulator members, the mounting for each lifter comprising a universal joint, substantially as described.

6. A plate manipulator, comprising a carrier movable in a fixed path, a plurality of manipulator members mounted on said carrier for horizontal movement in a direction at substantially right angles to the direction of movement of said carrier, a vertically movable support mounted on each of the manipulator members, and a plate lifter mounted on said support, substantially as described.

7. A plate manipulator, comprising a movable carriage, a horizontally extending manipulator bar mounted on said carriage for endwise movement in a direction at substantially right angles to the direction of movement of the carriage, a support mounted on said bar for vertical movement, and a plate lifter device mounted on said support and connected thereto by a universal joint, substantially as described.

8. A plate manipulator, comprising a movable carriage, a horizontally extending manipulator bar mounted on said carriage for endwise movement in a direction at substantially right angles to the direction of movement of the carriage, a support mounted on said bar for vertical movement, and a plate lifter magnet mounted on said support and connected thereto by a universal joint, substantially as described.

9. A plate manipulator comprising a supporting bed for the plates to be manipulated and upon which the plates may be supported for free movement, a carrier mounted for movement longitudinally of said support, a manipulator bar mounted on said carriage and extending laterally therefrom, means for moving said manipulator bar in a direction substantially at right angles to the movement of said carriage, and a plate-lifting device mounted on said bar and movable toward and away from the plate to be moved, substantially as described.

10. In a plate manipulator, comprising a supporting bed for the plates to be manipulated and having means for supporting the plates thereon in a manner to permit the free movement of said plates, a manipulator member movable over the said bed, and a lifting device mounted on said member and movable toward and away from the bed, substantially as described.

11. A plate manipulator comprising a support for the piece to be manipulated, two movable carriers mounted for movement relatively to said support, and a plate-lifting magnet mounted on each of said carriers, substantially as described.

12. A plate manipulator comprising a pair of carriages, a rigid connection between said carriages and upon which the carriages may be adjusted toward and away from each other, and a transversely movable manipulating device mounted on each of said carriages, together with means whereby said devices may be separately operated, substantially as described.

13. A plate manipulator comprising a pair of carriages, a rigid connection between said carriages and upon which the carriages may be adjusted toward and away from each other, and a transversely movable manipulating device mounted on each of said carriages, together with means whereby said devices may be separately operated, said carriages having rail gripping means, substantially as described.

14. The combination with a caster table, of a plate manipulator comprising a carriage mounted for movement between the table casters, a manipulator element mounted for transverse movement on the carriage, and a plate grip carried by the manipulator element, substantially as described.

15. The combination with a plate manipulator having manipulator elements mounted for longitudinal and transverse travel, of a straight edge extending parallel to the line of longitudinal movement and against which the plates may be moved by the transverse movement of the manipulator elements, substantially as described.

In testimony whereof, I have hereunto set my hand.

FLORENCE C. BIGGERT, Jr.